(12) United States Patent
Wirick

(10) Patent No.: US 8,401,075 B2
(45) Date of Patent: Mar. 19, 2013

(54) HYBRID VIDEO ENCODER INCLUDING REAL-TIME AND OFF-LINE VIDEO ENCODERS

(75) Inventor: Kevin S. Wirick, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 867 days.

(21) Appl. No.: 12/346,921

(22) Filed: Dec. 31, 2008

(65) Prior Publication Data

US 2010/0166054 A1 Jul. 1, 2010

(51) Int. Cl.
*H04B 1/66* (2006.01)
(52) U.S. Cl. ................................... 375/240.1
(58) Field of Classification Search ........... 348/397.1, 348/398.1
See application file for complete search history.

(56) References Cited

U.S. PATENT DOCUMENTS

| | | | |
|---|---|---|---|
| 4,953,196 A | 8/1990 | Ishikawa et al. | |
| 6,195,391 B1 * | 2/2001 | Hancock et al. | 375/240.24 |
| 6,639,943 B1 * | 10/2003 | Radha et al. | 375/240.11 |
| 2002/0191851 A1 * | 12/2002 | Keinan | 382/232 |
| 2006/0165168 A1 | 7/2006 | Boyce et al. | |
| 2007/0011718 A1 * | 1/2007 | Nee, Jr. | 725/135 |
| 2007/0116126 A1 | 5/2007 | Haskell et al. | |
| 2008/0137726 A1 | 6/2008 | Chatterjee et al. | |
| 2008/0225959 A1 | 9/2008 | Lu et al. | |
| 2009/0313676 A1 * | 12/2009 | Takeshima et al. | 725/119 |
| 2011/0182352 A1 * | 7/2011 | Pace | 375/240.1 |

OTHER PUBLICATIONS

"Video Compression Picture Typese", Wikipedia, accessed at http://en.wikipedia.org/wiki/Video_compression_picture_types on Oct. 29, 2008.*
Koc et al., "Motion Compensation on DCT Domain", Sep. 2001, EURASIP Journal on Applied Signal Processing, pp. 147-162.*

* cited by examiner

*Primary Examiner* — Matthew Smithers
(74) *Attorney, Agent, or Firm* — Susan R. Payne

(57) ABSTRACT

A method and apparatus is provided for encoding a video signal stream. The method includes receiving a video signal stream, identifying a plurality of individual segments within the video signal stream and encoding, off-line, recurring ones of the individual segments that recur with at least a first frequency to produce encoded recurring segments. The video signal stream is also encoded in real-time to generate a real-time encoded video stream. Segments in the real-time encoded video stream are replaced with their corresponding encoded recurring segments to thereby produce an encoded video output stream that includes some segments encoded in real-time and other segments encoded off-line.

20 Claims, 3 Drawing Sheets

HYBRID VIDEO ENCODER INCLUDING REAL-TIME AND OFF-LINE VIDEO ENCODERS

FIELD OF THE INVENTION

The present invention relates generally to video encoders and more particularly to video encoders that employs a combination of real-time and off-line encoding.

BACKGROUND

Digital video compression is an important technology in video communications, broadcasting, and storage. MPEG video coding standards have been successfully used to reduce the transmission bandwidth and storage space requirements in many applications, such as digital TV broadcast through satellite and cable, Digital Video Disk (DVD), Video on-Demand and video streaming over the Internet, etc. However, emerging applications and new services place increasing demands on compression techniques. For example, live news and sports events are transmitted in real-time to subscribers using MPEG-2 video coding standard (ISO/IEC 13818-2) at a constant bit rate (CBR) in the range of 0.6 to 2 Mbits/second for standard definition content. It is very challenging for conventional MPEG encoders available on the commercial market to produce acceptable picture quality at such bit rates.

Conventional real-time video encoders often employ a coding strategy that uses information retained in coding only the previously received video frames to encode a current frame. However, prediction and estimation based on past frames generally will not correctly describe the current frame. Such encoders are not able to determine and apply the best coding strategy to encode incoming video frames because they lack information about future frames. As a result real-time encoders generally do not achieve compressed video with as high quality encoding characteristics (e.g., less distortion in an encoded image while using fewer bits of information) as off-line encoders.

In comparison to real-time encoders, off-line (i.e., non-real-time) video encoders can provide compressed video with higher quality encoding characteristics by using complex algorithms that require higher computational overhead. Such algorithms can perform non-casual rate control and may exhaustively perform rate/distortion optimization to determine the number of bits required to reduce artifacts that arise from the compression process. For example, off-line encoders can employ techniques such as multipass encoding. With multipass encoding, a video sequence is encoded several times and each encoding pass uses the results of the preceding pass to adjust coding parameters to optimize, for example, average bit rate and/or decoder buffer fullness. Overall, the multipass encoding process is a trial and error process: select initial coding parameters, code the video sequence, examine the results to determine if performance requirements are met and recode as necessary using adjusted coding parameters for each subsequent iteration. For long sequences of digital video, however, coding the entire video sequence several times is inefficient and greatly increases the time required to generate an efficiently compressed sequence and thus multipass encoding, like other complex algorithms that achieve higher quality, are often reserved for off-line encoding.

SUMMARY

In accordance with the present invention, a method and apparatus is provided for encoding a video signal stream. The method includes receiving a video signal stream, identifying a plurality of individual segments within the video signal stream and encoding, off-line, recurring ones of the individual segments that recur with at least a first frequency to produce encoded recurring segments. The video signal stream is also encoded in real-time to generate a real-time encoded video stream. Segments in the real-time encoded video stream are replaced with their corresponding encoded recurring segments to thereby produce an encoded video output stream that includes some segments encoded in real-time and other segments encoded off-line.

In accordance with another aspect of the invention, a video encoder arrangement is provided that includes a video segmentation module for segmenting an input video stream into a plurality of video segments. The arrangement also includes a real-time video encoder for encoding the input video stream and a processor configured to identify recurring video segments in the input video stream that recur with at least a first frequency. The arrangement also includes an off-line video encoder for encoding the recurring video segments. The processor is further configured to replace segments in the input video stream encoded by the real-time encoder with corresponding ones of the encoded recurring segments.

DETAILED DESCRIPTION

As detailed below, a live video stream that is being delivered to a viewer is encoded using a combination of both real time and off-line encoding. In particular, off-line encoding is used to encode recurring material that is repeated multiple times, within the same program and possibly among different programs as well. Such material may include, without limitation, certain commercials, opening shots of a sporting event or other program, graphics such as those that are presented as an introduction to a featured segment in a program (e.g., graphics that are presented as an instruction to a slow-motion replay in a football game) and graphics and material that are presented as interstitials (e.g., ESPN Sports Center interstitials). Recurring material that is repeated more than a threshold number of times during one or more programs is encoded at a relatively high quality using an off-line encoder. The other material (i.e., nonrecurring material and recurring material that is repeated less than a threshold number of times) in the live video is encoded using an on-line or real-time encoder, which generally will encode video at a lower quality than the off-line encoder. If incoming material in the live video stream is recognized as material that has been previously encoded and stored off-line, the encoded material is retrieved from storage and substituted for the real-time encoded material which would otherwise be included in the compressed video output stream.

Figure 1:
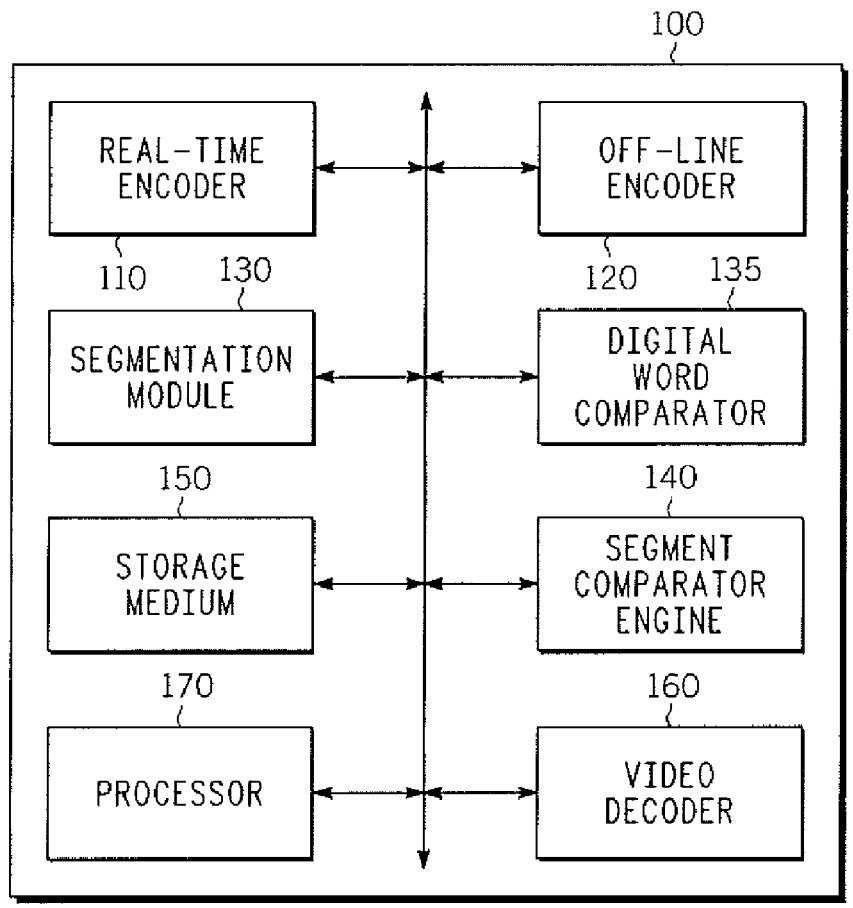
FIG. 1 is a functional block diagram of one example of a hybrid encoder that may implement the techniques and processes described herein.

FIG. 1 is a functional block diagram of one example of a hybrid encoder 100 that may implement the techniques and processes described herein. The hybrid encoder 100 includes real-time encoder 110, off-line encoder 120, segmentation module 130, digital word comparator 135, segment or scene comparator engine 140, storage medium 150 and video decoder 160. Additionally, the various elements shown in FIG. 1 operate under the control of a processor 170. The operation of the hybrid encoder 100 will be described with reference to FIG. 2.

Figure 2:
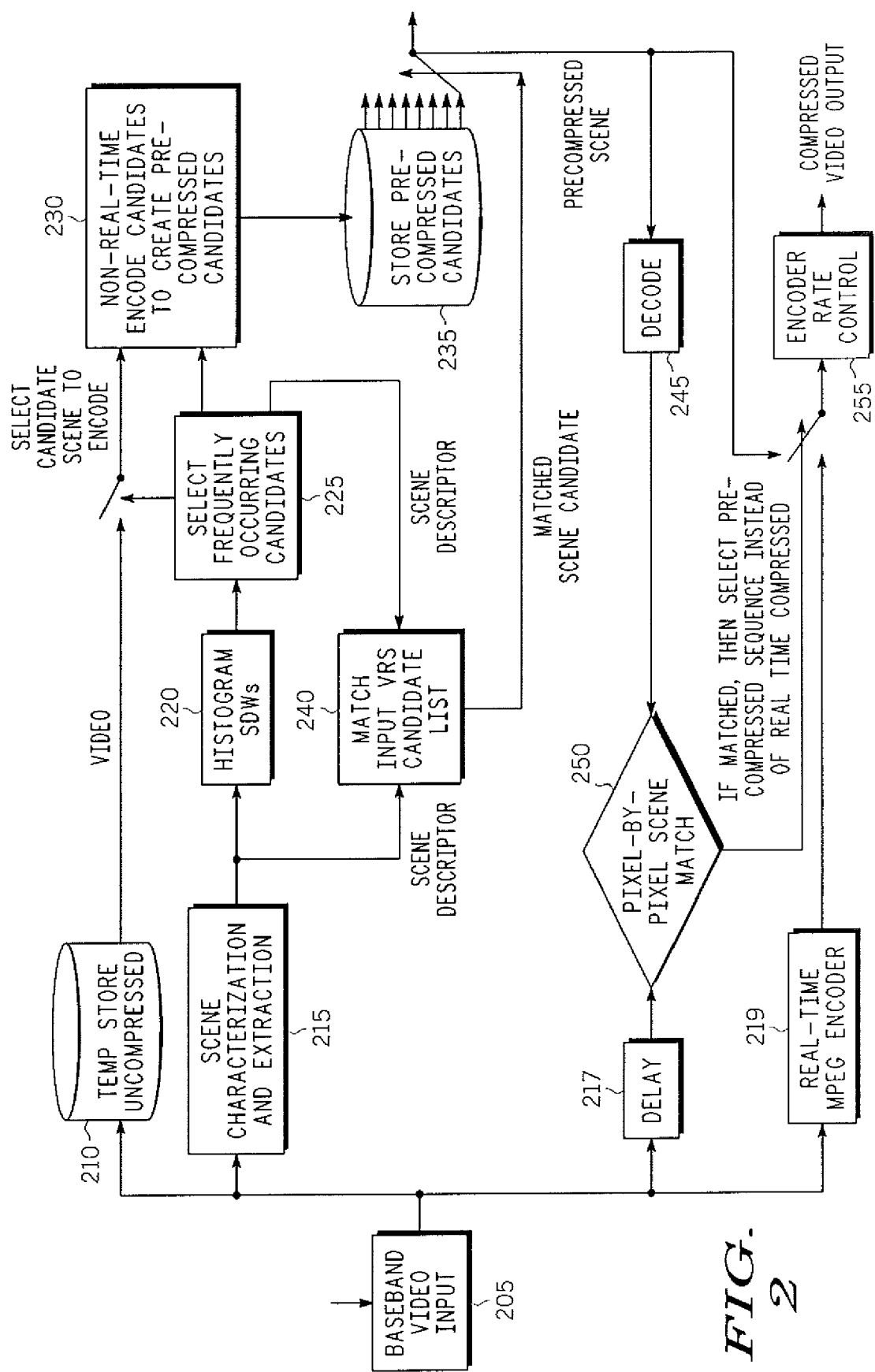
FIG. 2 is a flow diagram illustrating one example of the operation of the hybrid encoder depicted in FIG. 1.

FIG. 2 is a flow diagram illustrating one example of the operation of the hybrid encoder 100 depicted in FIG. 1. As shown, a baseband video input signal is received at block 205 and directed to blocks 210, 215, 217 and 219. More specifically, copies of the video signal are respectively encoded in real-time by real-time encoder 110 at block 219, delayed at block 217, temporarily stored in a buffer at block 210 and directed to the segmentation module 130 at block 215.

The segmentation module 130 extracts individual segments such as scenes at block 215. In one implementation in which the video is segmented into scenes, segmentation is accomplished by identifying scene changes between temporally adjacent scenes in accordance with well known techniques. Each segment is assigned an identifier such as a digital word. The identifier is sufficiently descriptive to correctly recognize a segment with a certain degree of probability, which may vary from application to application. The digital word may represent various features in the segment such as the first or last frame, the number of frames in the segment, and so on. The segment descriptor word generated at block 215 is recorded on a histogram at block 220. The histogram tabulates the frequency with which each word, and hence each segment, appears in the video input signal. The histogram may be maintained in a database located, for example, in the segmentation module 130 itself or in storage medium 150. Next, at block 225 those segments that are repeated with a certain frequency and which were buffered at 210 are transferred to off-line encoder 120 and encoded at block 230. The encoded segments are then stored at block 235 in, e.g., storage medium 150.

Continuing at block 240, the segment descriptor words generated from the baseband video input signal at block 215 are compared by word comparator 135 to the segment descriptor words identifying the pre-encrypted segments that have been stored at block 235. If two words are found to match, there is a certain probability that the segments are the same. If such a match is found, additional steps may be performed to confirm that the segments are indeed the same. For instance, in this example, the pre-encrypted segment corresponding to the matched word is retrieved from storage and decoded at block 245 by the video decoder 160. At block 250, the decoded segment is compared by segment comparator 140 to the rendition of the segment that underwent a delay at block 217. The comparison may be performed on a frame-by-frame and pixel-by-pixel basis in accordance with well-known techniques, such as by measuring the correlation between frames using a mean squared error metric, for example. If the segment descriptor word match identified at block 240 is confirmed by a segment match at block 250, then, at block 255, the pre-encrypted segment is substituted for the corresponding segment that has been encrypted in real-time at block 219.

In some implementations the segment comparison performed at block 250 by segment comparator 140 may be eliminated if the segment descriptor word matching performed at block 240 has an adequately high rate of accuracy so that additional confirmation that the two segments being compared are the same is deemed unnecessary. In this case both the segment comparator 140 and the video decoder 160 shown in FIG. 1 may be eliminated.

The recurring material that is encoded off-line in the previously discussed implementations has been described as a segment or scene, which generally consists of one or more consecutive video frames or pictures. In some implementations, however, the material that is encoded off-line may be a sub-set of one or more frames or pictures. For example, it is often the case that only portions of a frame are frequently repeated in a video program. As another example, the background in a newscast is not only frequently repeated, it may appear throughout virtually the entire newscast. Likewise, the background in a sporting event that is recorded by a fixed camera is often repeated multiple times. Similarly, foreground objects or graphics (e.g., a broadcaster's logo) may also be repeated.

The frequently recurring portion of the frame or picture may be separately encoded off-line and then combined with the remainder of the frame or picture, which is encoded in real-time. This may be accomplished, for instance, by treating the frequently recurring portion of the frame or picture as a horizontal slice, which, in the context of video encoding and compression, is a spatially distinct region of a frame or picture that is encoded separately from any other region in the same frame or picture. In such an implementation the recurring segments of the video that are identified and processed off-line are slices. The slices are otherwise treated as a segment of the video in the manner described above.

Figure 3:
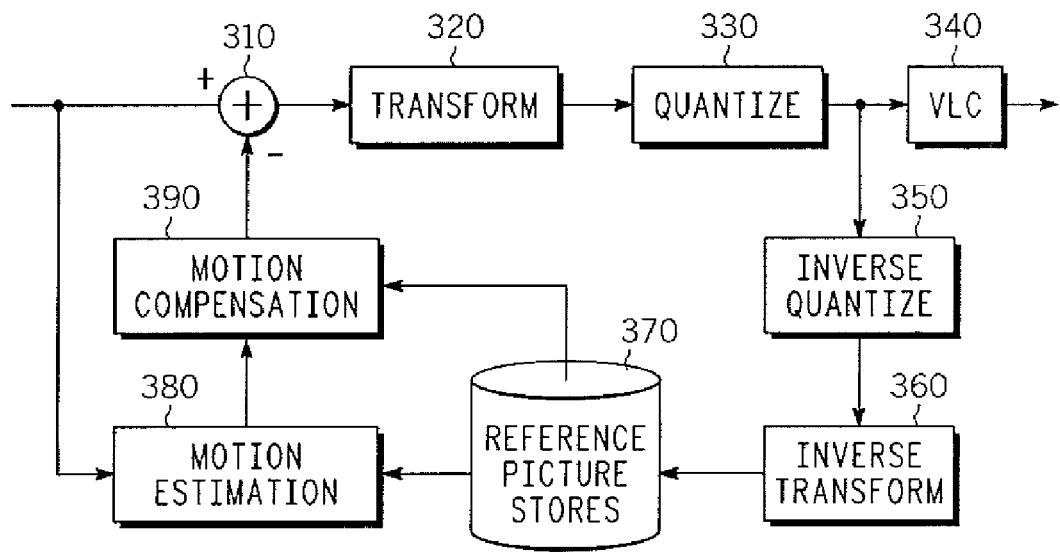
FIG. 3 shows one example of a video encoder that may be employed in the hybrid encoder shown in FIG. 1.

FIG. 3 shows one example of a video encoder 300. The encoder 300 can implement digital video encoding protocols such as, for example, any one of the Moving Picture Experts Group (MPEG) standards (e.g., MPEG-1, MPEG-2, or MPEG-4) and/or the International Telecommunication Union (ITU) H.264 standard. Additionally, the constituent components of the encoder 300 can be implemented in hardware, software or any combination thereof. The video encoder 300 may be employed as a real-time encoder or an off-line encoder, depending, for example, on the complexity of the algorithms that are employed. For example, when used as a real-time encoder, the encoder 300 may employ single or double pass encoding. On the other hand, when used as an off-line encoder, the encoder 300 may employ more complex multipass encoding techniques that employ, for example, non-causal analysis to optimize quantization decisions. As shown, the input to the encoder 300 on which the video signal is received is connected to a non-inverting input of a summing junction 310. The output of the summing junction 310 is connected to a transform function block 320 and the transformer 320 is connected to a quantizer 330. The output of the quantizer 330 is connected to a variable length coder ("VLC") 340, where the output of the VLC 340 is an externally available output of the encoder 300. The output of the quantizer 330 is further connected to an inverse quantizer 350. The inverse quantizer 350 is connected to an inverse block transform function 360, which, in turn, is connected to a reference picture store 370. A first output of the reference picture store 370 is connected to a first input of a motion estimator 380. The input to the encoder 300 is further connected to a second input of the motion estimator 380. The output of the motion estimator 380 is connected to a first input of a motion compensator 390. A second output of the reference picture store 370 is connected to a second input of the motion compensator 390. The output of the motion compensator 390 is connected to an inverting input of the summing junction 310.

Figure 4:
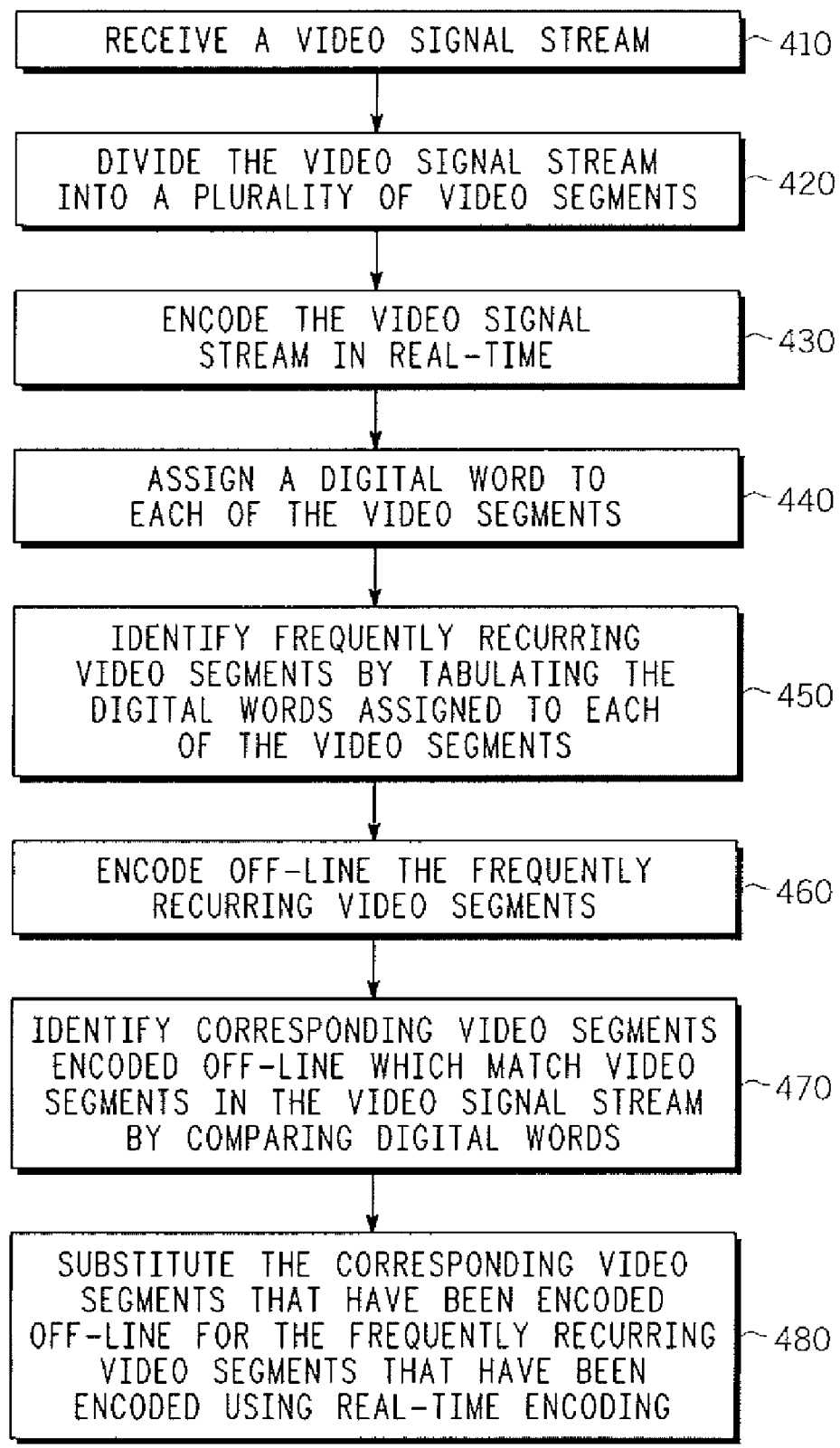
FIG. 4 is a flowchart showing one example of a method for encoding a video signal stream.

FIG. 4 is a flowchart showing one example of a method for encoding a video signal stream. The method may be implemented by any of a variety of different hybrid encoders, including but not limited to the hybrid encoder shown in FIG. 1. The method begins in step 410 by receiving a video signal stream and continues in step 420 by dividing the video signal stream into a plurality of video segments. The video signal stream is encoded in real-time in step 430. A digital word is assigned to each of the video segments in step 440. Next, in step 450, frequently recurring video segments are identified by tabulating the digital words assigned to each of the video segments. The frequently recurring video segments are encoded off-line and stored in step 460. The video segments encoded off-line which match or correspond to video segments in the video signal stream are identified in step 470 by comparing the digital words assigned to the video segments in the video signal stream with the digital words assigned to the video segments encoded off-line. In step 480, the corresponding video segments that have been encoded off-line and which have identified in step 470 are substituted for the frequently recurring video segments that have been encoded using real-time encoding.

The functions of the various elements shown in the figures above may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included in the processor. Such a processor will execute instructions, either at the assembly, compiled or machine-level, to perform the processes described above. Those instructions can be written by one of ordinary skill in the art following the description presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, or silicon memory (e.g., removable, non-removable, volatile or non-volatile. In addition, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A method of encoding a video signal stream, comprising:
   receiving a video signal stream;
   identifying a plurality of individual segments within the video signal stream;
   encoding off-line recurring ones of the individual segments that recur with at least a first frequency to produce encoded recurring segments;
   encoding the video signal stream in real-time to generate a real-time encoded video stream, wherein during encoding the video signal stream in real-time, performing:
      comparing segments in the real-time encoded video stream with encoded recurring segments to determine if any encoded recurring segments correspond with the segments in the real-time encoded video; and
      replacing segments in the real-time encoded video stream with their corresponding encoded recurring segments to thereby produce an encoded video output stream that includes some segments encoded in real-time and other segments encoded off-line.

2. The method of claim 1 wherein the individual segments in the video signal stream are individual scenes.

3. The method of claim 1 wherein the individual segments in the video signal stream are picture slices.

4. The method of claim 2 wherein the individual scenes are identified by identifying scene changes separating temporally adjacent scenes.

5. A method of encoding a video signal stream, comprising:
   receiving a video signal stream;
   identifying a plurality of individual segments within the video signal stream;
   assigning to each of the individual segments a digital word representative of the individual segment to which it is assigned;
   encoding off-line recurring ones of the individual segments that recur with at least a first frequency to produce encoded recurring segments;
   encoding the video signal stream in real-time to generate a real-time encoded video stream and
   replacing segments in the real-time encoded video stream with their corresponding encoded recurring segments to thereby produce an encoded video output stream that includes some segments encoded in real-time and other segments encoded off-line.

6. The method of claim 5 further comprising comparing a first digital word assigned to a first segment with recurring digital words assigned to the encoded recurring segments.

7. The method of claim 6 wherein, if the first digital word matches a given recurring digital word assigned to a given encoded recurring segment, replacing the first segment with the given encoded recurring segment.

8. The method of claim 6 wherein, if the first digital word matches a given recurring digital word assigned to a given encoded recurring segment, decoding the given encoded recurring segment and comparing it to its corresponding segment in the video signal stream and, if the decoded given recurring segment matches the corresponding segment, replacing the first segment with the given encoded recurring segment.

9. At least one non-transitory computer-readable storage medium encoded with instructions which, when executed by a processor, performs a method including:
   receiving a video signal stream having a plurality of video segments;
   encoding the video signal stream in real-time, wherein during encoding the video signal stream in real-time, performing:
      comparing frequently recurring video segments in the real-time encoded video stream with pre-encoded video segments to determine if any pre-encoded video segments correspond with the segments in the real-time encoded video; and
      substituting frequently recurring video segments encoded using real-time encoding with corresponding pre-encoded video segments.

10. The non-transitory computer-readable medium of claim 9 wherein the corresponding pre-encoded video segments are encoded using off-line encoding.

11. The non-transitory computer-readable medium of claim 9 further comprising identifying the frequently recurring video segments by tabulating digital words assigned to each of the video segments.

12. The non-transitory computer-readable medium of claim 11 wherein comparing comprises identifying the corresponding pre-encoded video segments by comparing the digital words assigned to the video segments with the digital words assigned to the corresponding pre-encoded video segments.

13. The non-transitory computer-readable medium of claim 11 wherein comparing comprises identifying the corresponding pre-encoded video segments by first comparing the digital words assigned to the video segments with the digital words assigned to the corresponding pre-encoded video segments to identify a candidate video segment and a candidate corresponding pre-encoded video segment and then decoding the candidate corresponding pre-encoded video segment and comparing it to the candidate video segment on a pixel by pixel basis to thereby confirm that the two candidate segments represent the same video segment.

14. The non-transitory computer-readable medium of claim 9 further comprising dividing the video signal stream into the plurality of video segments by identifying scene changes arising in the video signal stream.

15. A video encoder arrangement, comprising:
a video segmentation module for segmenting an input video stream into a plurality of video segments;
a real-time video encoder for encoding the input video stream;
a processor configured to identify recurring video segments in the input video stream that recur with at least a first frequency;
an off-line video encoder for encoding the recurring video segments; and
wherein during encoding the input video stream using the real-time video encoder, the processor is further configured to:
compare segments in the input video stream with encoded recurring segments to determine if any encoded recurring segments correspond with the segments in the input video stream, and
replace segments in the input video stream encoded by the real-time encoder with corresponding ones of the encoded recurring segments.

16. The video encoder of claim 15 wherein the segments are scenes or picture slices.

17. The video encoder of claim 15 further comprising:
a storage medium for storing the encoded recurring segments; and
a segment comparator for comparing the video segments to the encoded recurring segments stored in the storage medium to thereby identify the corresponding ones of the encoded recurring segments.

18. The video encoder of claim 15 wherein the video segmentation module is configured to assign a digital identifier to each of the video segments and the segment comparator compares the digital identifiers assigned to the video segments to the digital identifiers assigned to the encoded recurring segments to identify candidate corresponding segments.

19. The video encoder of claim 18 further comprising a decoder for decoding the candidate corresponding segments and wherein the segment comparator is further configured to compare the decoded candidate corresponding segments to the video segments to confirm that the corresponding encoded recurring segments correctly match the video segments in the input video stream which they are replacing.

20. A video encoder arrangement, comprising:
a video segmentation module for segmenting an input video stream into a plurality of video segments;
a real-time video encoder for encoding the input video stream;
a processor configured to identify recurring video segments in the input video stream that recur with at least a first frequency;
an off-line video encoder for encoding the recurring video segments, wherein:
the processor is further configured to replace segments in the input video stream encoded by the real-time encoder with corresponding ones of the encoded recurring segments, and
the video segmentation module is configured to assign a digital identifier to each of the video segments and the segment comparator compares the digital identifiers assigned to the video segments to the digital identifiers assigned to the encoded recurring segments to identify the corresponding encoded recurring segments.

* * * * *